Nov. 18, 1947.  L. FLAA  2,431,235
TREE TRIMMING AND PRUNING SAW
Filed Dec. 3, 1945
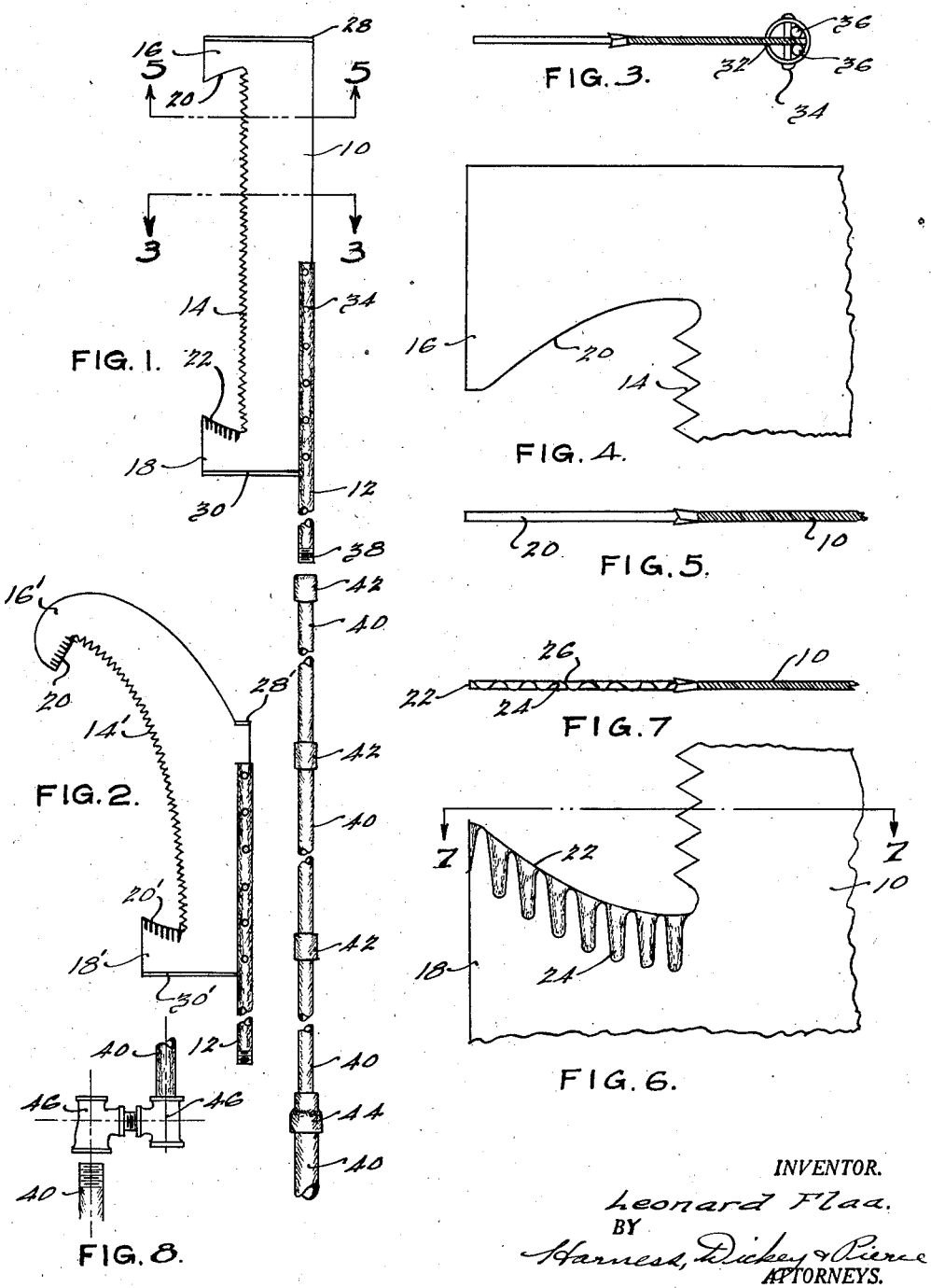
INVENTOR.
Leonard Flaa.
BY
Harness, Dickey & Pierce
ATTORNEYS.

Patented Nov. 18, 1947

2,431,235

UNITED STATES PATENT OFFICE 2,431,235

TREE TRIMMING AND PRUNING SAW

Leonard Flaa, Ishpeming, Mich.

Application December 3, 1945, Serial No. 632,418

1 Claim. (Cl. 30—144)

The invention relates broadly to saws and more particularly to a saw that is especially adapted for trimming or pruning trees and the like.

An important object of the invention is to provide a tree trimming and pruning saw in which the handle can be quickly and readily extended to any desired length so that the saw can be used to cut work high above the ground or remote from the operator.

Another object of the invention is to provide a saw of the above mentioned character having knife edges at each end of the blade that can be used to sever small shoots or branches.

Still another object of the invention is to provide a saw of the above mentioned character in which the handle is uniquely associated with the saw blade to lend rigidity thereto and prevent the blade from buckling when the cutting edges above referred to are used.

Yet another object of the invention is to provide a saw of the above mentioned character in which the blade is equipped with stops which project laterally and at opposite ends of the cutting teeth and prevent the blade from inadvertently pulling out of the saw cut.

A further object of the invention is to provide a saw of the above mentioned character in which the stop members have cutting edges positioned to engage the work at the ends of the saw stroke and form transverse kerfs ahead of the main saw cut which prevent the falling limb from stripping the bark and outer wood layers back from the saw cut.

A still further object of the invention is to provide a saw of the above mentioned character in which the lateral extensions have sufficient rigidity so that they can be used to pull or push severed branches from the tree.

A yet further object of the invention is to provide a saw of the above mentioned character that is simple in construction, efficient in operation and inexpensive to manufacture.

Other objects and advantages of the invention will be apparent during the course of the following description.

In the drawing forming a part of this specification and wherein like numerals are employed to designate like parts throughout the same, Fig. 1 is a side elevation of a saw embodying the invention and showing a handle associated therewith, Fig. 2 is a view similar to Fig. 1 but showing a modified type of saw blade, Fig. 3 is an enlarged, transverse sectional view taken on the line 3—3 of Fig. 1, Fig. 4 is an enlarged, fragmentary view showing a portion of the blade used in Fig. 1, Fig. 5 is an enlarged, transverse sectional view taken on the line 5—5 of Fig. 1, Fig. 6 is an enlarged fragmentary view of another portion of the saw blade used in Fig. 1, Fig. 7 is a transverse sectional view taken on the line 7—7 of Fig. 6, and Fig. 8 is a fragmentary, side elevational view showing a modified type of handle for the saw.

Considered in certain of its broader aspects, the tree trimming and pruning saw embodying the present invention comprises an elongated saw blade equipped with a substantially rod-like handle. The handle extends longitudinally of the blade and, at its distal end, the handle is provided with a conventional pipe thread. Thus, a conventional handgrip can be attached to the handle when it is to be used in the conventional manner; or, alternatively, it can be coupled to a standard pipe section when it is desired to cut objects remote from the user. Manifestly, any desired number of pipe sections can be attached end to end to extend the handle to any desired length so that the user can easily reach the work with the saw blade. Since standard pipe sections are used, the handle extensions are readily available and they can be added or removed quickly and easily. Another advantage in using standard pipe sections is that a portion of the handle can be offset by using elbow joints or other suitable connections and the handle made to extend around a limb or other obstruction which ordinarily would interfere with the sawing operation.

The saw blade itself is also an important feature of the invention. At each end of the blade are transverse extensions which project laterally of the cutting teeth. These extensions form stop members which engage the branch at the ends of the cutting stroke and prevent the blade from inadvertently pulling out of the saw cut. Preferably, the inner edges of the extensions are sharpened so that they cut into the bark and underlying wood layers. In such case the extensions serve a dual purpose, namely, as stops and as cutting edges. The lateral kerfs thus formed by the extensions in advance of the main saw cut prevent the falling limb from stripping or peeling the bark and wood layers back from the stub-end of the branch and thus precludes common but unnecessary injury to the tree.

The toother edge of the blade may be either straight or curved; but, in either event, the cutting edges of the extensions are disposed in angular relation therewith so that they engage the limb for a substantial distance ahead of the saw cut. If desired, these edges may be curved somewhat so that they better accommodate the curved outer surface of the limb.

I prefer that the extensions be formed with flutes or corrugations which extend through the cutting edges. These corrugations may be angular or wavy, crossing and recrossing from side to side of the blade, or the blade material may be laterally extruded to give the corrugations "set." The corrugations prevent binding of the extensions in the transverse kerfs since shavings are cut from the kerfs by giving the blade a slight lateral flip when the extensions are forced against the work.

A chisel or knife edge is also provided along at least one end of the blade for cutting or snipping shoots and small branches. These branches are sometimes difficult to saw through because of their flexibility but they can be removed easily in this manner. After the branches and shoots have been severed they can be pulled or pushed out of the tree by the extensions which are easily engaged with the branch if it becomes entangled.

Still another feature of the invention is the manner in which the tubular handle is attached to the blade. The handle extends approximately half way along the back of the blade which projects into the handle through a longitudinal slot. Rivets extending transversely through the handle and blade hold the edges of the slot pressed firmly against the sides of the blade and a pair of filler pieces extending longitudinally into the handle at one side of the rivets and at opposite sides of the blade prevent the latter from twisting about the axis of the handle. From the foregoing, it will be readily appreciated that the handle substantially reinforces the blade but since it extends only part way along the latter a limb of any thickness can be cut by using the projecting portion of the blade.

While I have described the saw as particularly adapted for trimming and pruning trees, it will be readily apparent that it can be used for a large number of analagous purposes. For example, the saw can be used whenever it is desired to cut through some object not readily accessible to the user. Overhanging wreckage from fires, explosions and the like may be cut from safe distances. It will be apparent that the blade may be either metal or wood cutting.

For a more detailed description of the invention, reference is had to the accompanying drawings wherein the saw blade is designated by the numeral 10 and the handle by the numeral 12. At its forward edge the blade 10 is provided with saw teeth 14 and at opposite ends thereof are transverse extensions 16 and 18 which project laterally of the teeth. These extensions provide stop members which limit the cutting stroke and prevent the blade 10 from inadvertently pulling out of the saw cut. In addition, the extensions 16 and 18 can be used to push or pull severed limbs from the tree.

The toothed edge of the blade 10 can either be rectilinear, as shown in Fig. 1, or curved, as shown in Fig. 2. In either event, however, the adjacent or inner edges 20 and 22 of the extensions 16 and 18 are angularly disposed with respect to the saw teeth 14 and to each other so that they engage the limb for a substantial distance ahead of the saw cut. To better adapt the saw for cutting cylindrical work, such as tree limbs and the like, the edges 20 and 22 are curved in the manner shown in Fig. 4. The edges 20 and 22 are preferably sharp so that they cut through the bark and subjacent cambium layers when the stops 16 and 18 are forced against the limb at the ends of each stroke. Since the edges 20 and 22 are arcuately curved they engage the limb flatly and by reason of their angular relation with the toothed edge they cut into the limb for a substantial distance ahead of the main saw cut. By swinging the handle of the saw in a limited arc during sawing the kerf can be extended all the way around the limb and thus all possibility of the bark or outer wood layers being stripped back from the stub end of the branch when the limb falls is avoided. If desired, only the edge 22 may be sharpened as shown in Fig. 1; however, by sharpening both of the edges 20 and 22, the arc of severance is considerably extended.

I have found that if the stop members 16 and 18 are also provided with vertical flutes or corrugations 24 the cutting action of edges 20 and 22 is substantially enhanced. As best shown in Fig. 6, the corrugations 24 extend substantially at right angle to and open through the cutting edges 20 and 22 whereby to define an angular or wavy cutting edge 26, as best shown in Fig. 7. The corrugations preferably are merely cut into the side of the saw blade so that the cutting edge 26 crosses and recrosses from side to side of the blade. However, if desired the material of the saw blade may be extruded laterally at the corrugations to give it "set." As suggested, if the handle 12 is given a slight lateral flip as the extensions are forced against the work the cutting edges 20 and 22 can be made to cut a small shaving or chip therefrom. This prevents the stops from binding in the transverse kerfs and makes it possible to cut the kerfs to a greater depth.

The ends of the saw blade 10 are also formed with chisel or knife cutting edges 28 and 30 which are admirably adapted for cutting and snipping shoots and small branches. The cutting edges 28 and 30 preferably extend entirely across the blade, however, if the latter is curved as shown in Fig. 2, the upper cutting edge 28' merely comprises a lateral offset at the back of the blade directly above the handle 12. On the curved saw blade the upper cutting edge 28' is placed in line with the handle 12 rather than at the end of stop 16' since the handle lends rigidity to the blade and thus renders the cutting action of edge 28' more effective.

Since the handle 12 is adapted for attachment to standard pipe sections it can best and least expensively be made from a length of pipe. The rear portion of the blade 10 extends into the tubular handle 12 through a longitudinal slot 32 in one side of the latter. It will be observed that the handle 12 extends only part way along the saw blade so that the portion of the blade beyond the handle can be used for sawing relatively thick work; however, even though the handle 12 extends only part way along the blade it lends substantial rigidity thereto. The blade 10 is attached to the handle 12 by a plurality of transverse rivets 34 and these rivets hold the blade clamped tightly between the edges of slot 32. Filler pieces or rods 36, which extend longitudinally into the handle 12 at one side of the rivets 34 and at opposite sides of the blade 10, hold the latter rigidly positioned and prevent it from twisting about the axis of the handle.

The handle 12 preferably is relatively short and its distal end is formed with a standard male pipe thread 38. A hand grip handle (not shown) can be screwed into the thread 38 when it is desired to use the saw in the conventional manner. Alternatively, a plurality of pipe sections 40 suitably connected together by couplings 42 can be attached to the handle when it is desired to use the saw for cutting branches or other objects remote from the user. The number of pipe sections in the extended handle of course depends upon the distance the object to be cut is from the operator. The pipe sections 40 can be of any desired length but they preferably are relatively short so that they can be easily carried about. If it is desired to use pipe sections of different diameters they can be connected by conventional joint 44, as shown in Fig. 1.

The advantages of a handle of this type will be readily apparent. The handle can be easily formed without using special tools and it can be made of any desired length depending upon the exigencies of the particular situation. Moreover, if limbs or other objects form an obstruction in the path of the limb to be cut, the handle can be suitably offset and made to extend around the obstruction by using T-couplings 46, as shown in Fig. 8.

In view of the foregoing, it will be readily apparent that I have produced a saw that can easily be made by usual equipment in any saw factory. The materials used are all of standard manufacture. The saw is efficient in operation and can be manufactured at a reasonable price. It can be used for many different purposes and will prove to be extremely useful to farmers, orchard owners, handymen, telegraph and telephone companies, electric light and power companies, the park departments of cities, tree surgeons, wrecking crews (for cutting overhanging wreckage from after fires and explosions), departments of forestry and conservation, and many others.

It is to be understood that the forms of invention herewith shown and described are to be taken as preferred examples of the same and that the various changes in the size, shape and arrangement of parts may be resorted to without departing from the spirit of the invention or the scope of the appended claim.

Having thus described the invention, I claim:

In a tree trimming and pruning saw, a saw blade having a toothed longitudinal edge and a transverse extension at each end thereof, said extensions projecting laterally of the cutting teeth and forming stop members adapted to engage the work at the ends of the cutting stroke and prevent the blade from inadvertently pulling from the saw cut, the portions of said transverse extensions which engage the work being provided with cutting edges whereby to form lateral kerfs at each end of the main saw cut, the cutting edge of at least one of said extensions being transversely undulating from one face of the blade to the other whereby successive engagements of said cutting edge with the work will be displaced from the line of previous engagement thus removing chips from the work and forming a kerf of a width substantially equal to the width of the saw cut.

LEONARD FLAA.

REFERENCES CITED

The following references are of record in the file of this patent:

UNITED STATES PATENTS

| Number | Name | Date |
| --- | --- | --- |
| 697,167 | Phillips | Apr. 8, 1902 |
| 1,697,088 | Reed | Jan. 1, 1929 |
| 1,769,400 | Talmage | July 1, 1930 |
| 1,922,877 | Bottsford | Aug. 15, 1933 |